Aug. 2, 1966    G. H. FATHAUER    3,263,496
LOAD CELL AND WEIGHING SYSTEM
Filed March 14, 1963    2 Sheets-Sheet 1

INVENTOR.
GEORGE H. FATHAUER
BY
PENDLETON, NEUMAN,
SEIBOLD & WILLIAMS
ATTORNEYS

INVENTOR.
GEORGE H. FATHAUER
BY
PENDLETON, NEUMAN,
SEIBOLD & WILLIAMS
ATTORNEYS

United States Patent Office 3,263,496
Patented August 2, 1966

---

3,263,496
LOAD CELL AND WEIGHING SYSTEM
George H. Fathauer, Decatur, Ill., assignor to Radson Engineering Corporation, Macon, Ill., a corporation of Illinois
Filed Mar. 14, 1963, Ser. No. 265,087
24 Claims. (Cl. 73—141)

This invention relates to an electronic weighing system and more particularly to such a weighing system employing one or more unique load cells as transducers for deriving an electrical signal in response to displacement of a loaded member. The loaded member is connected to the core of a transformer to produce an electrical output proportional to the displacement of the loaded member.

In weighing apparatus, the weight to be measured is usually first transformed into displacement, and then the amount of displacement is measured in order to calculate the weight giving rise to such displacement. One way of measuring this displacement is by displacing a magnetically permeable core or slug within a differential transformer having a uniformly excited primary winding, to change the amount of response produced by the secondary winding of the transformer. The output of the secondary winding is then measured to determine the weight acting on the load cell.

In order for such systems to be accurate, it is important that the change in output of the secondary winding of the transformer be a known and preferably linear function of the weight of the object being weighed. Another requirement for accuracy is that the load cell be compensated to correct for changes in temperature which affect the amount of displacement of the load cell for a given weight. Still another requirement is that the measuring system, which measures the output of the load cell, introduce no nonlinearities into the measurement. An optional, but desirable feature of such a system is that it be capable of measuring a wide range of forces with good accuracy.

In the weighing systems of the prior art, it has been impossible to attain a high degree of accuracy over a wide range except with expensive equipment which is complex and difficult to maintain.

Accordingly, it is an important object of the present invention to provide a simple, inexpensive and accurate weighing system which is capable of a wide range.

Another object of the present invention is to provide a load cell capable of accurately converting a force into a unidirectional displacement of a slug within a differential transformer, substantially without hysteresis.

A further object of the present invention is to provide a load cell including a transformer, the primary circuit of which has a high resistive impedance so that a plurality of such load cells may have their primary circuits connected in parallel to extend the range of the weighing system.

Another object of the present invention is to provide a load cell which is temperature compensated to have an output characteristic which is linear with respect to force, irrespective of temperature changes at the load cell.

A further object of the present invention is to provide a load cell which may be independently calibrated by means of a variable resistance within the cell to permit a plurality of such cells to be employed with a weighing system to extend the range of the system without the necessity for recalibration.

Another object of the present invention is to provide a load cell which produces an output current directly proportional to the force acting on the load cell.

A further object of the present invention is to provide an electronic weighing device including a load cell and an electronic system for accurately measuring the current output of the load cell without introducing nonlinearities into the weight determination.

Further and additional objects of this invention will become manifest from a consideration of this specification, the accompanying drawings and the appended claims.

In one embodiment of this invention there is provided a weighing system comprising a load cell having a displaceable slug or core member, which is displaced proportionally in response to the weight supported by the load cell. A transformer having primary and secondary windings magnetically linked by the slug, has its primary winding energized with a uniform electrical A.C. signal. The secondary winding therefore generates a first electrical current proportional to the displacement of the slug. A generator generates a second electrical current of opposite sign to the first current, and the first and second currents are algebraically added together in a summing device. A detector is connected to the summing device for indicating when the sum of said first and second currents is zero, and a control mechanism is associated with the generator for selectively varying the amount of the second current until the detector indicates a zero current sum. A display device in the form of a calibrated dial is associated with the control mechanism for displaying directly the weight supported by the load cell when the detector indicates a zero current sum.

For a more complete understanding of this invention reference will now be made to the accompanying drawings in which.

Figure 1:
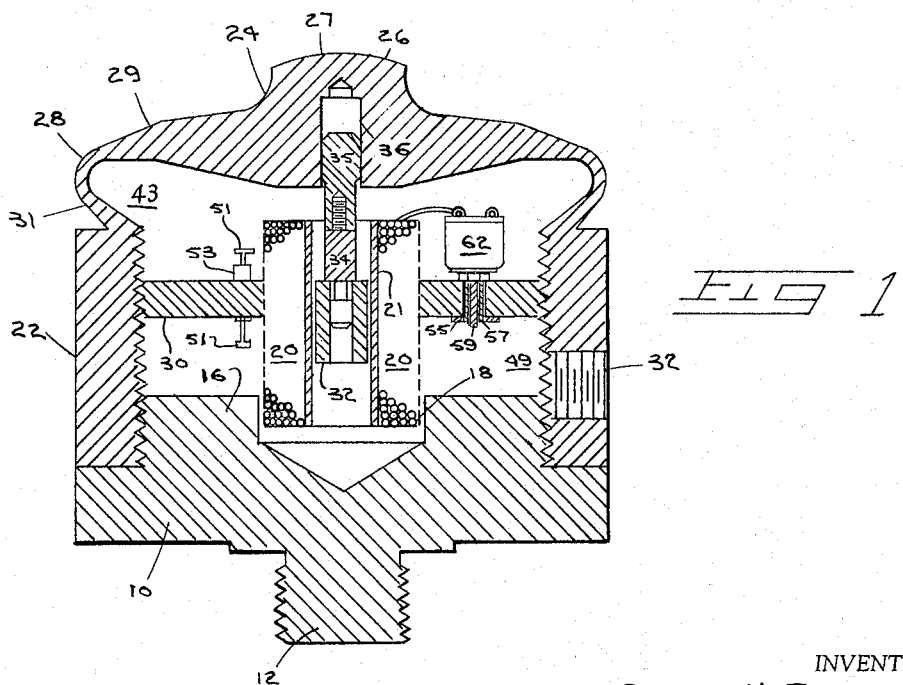
FIG. 1 is a longitudinal sectional view of a load cell embodying the present invention.

Referring now to FIG. 1, there is illustrated a load cell having a load-bearing base member 10 to which is integrally connected a threaded shaft 12 so that the base member 10 may be detachably connected to a suitable load-bearing support (not shown). The base 10 is generally in the form of a flat disc having an outwardly threaded upstanding central portion 16 in which is provided a centrally disposed recess 18 housing a portion of a differential transformer 20. The transformer 20 includes a primary winding and a pair of secondary windings wound about a low permeability form 21.

The upstanding portion 16 of the base 10 is threadably connected to an annular bearing member 22 which is in the form of a hollow substantially rigid right circular cylinder. Integral with the bearing member 22 is a load receiving member 24 generally in the form of a disc having edges of diminished thickness and also having a central upstanding projection 26 extending axially away from the base 10 and the bearing member 22. The upper surface 27 of the projection 26 is a spherical surface and is adapted to receive the downwardly directed load of the weight which is to be measured.

The bearing member 22 and the load receiving member 24 are connected to each other by way of an outwardly bowed annular member 28 which is integral with both the bearing member 22 and the load receiving member 24, and which has an upper portion 29 extending outwardly and downwardly from the periphery of the load receiving member 24 and a lower portion 31 extending downwardly and inwardly to connect with the interior portion of the top of the cylindrical wall of the bearing member 22.

Figure 2:
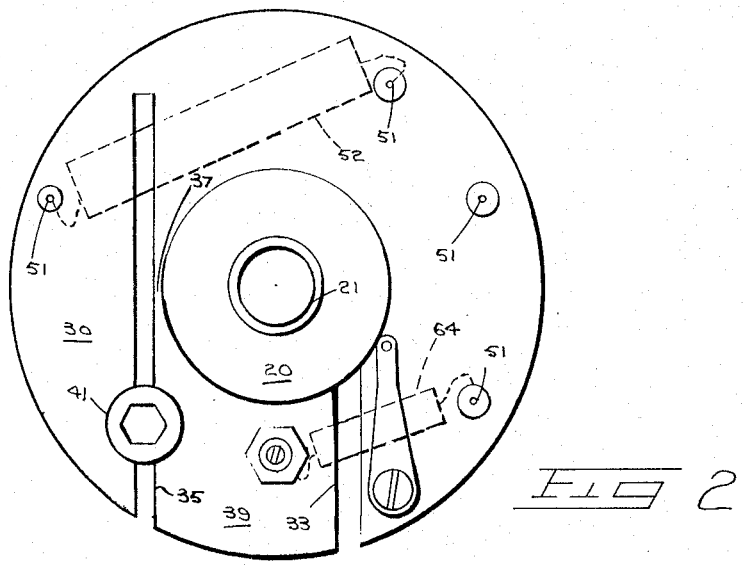
FIG. 2 is an enlarged plan view of the lower surface of a spacer element in the load cell of FIG. 1.

The bearing member 22, the load receiving member 24 and the bowed annular member 28 are preferably formed out of a single piece of steel which is precisely machined in a lathe, or the like, to form a volume of revolution having the cross section shown in FIG. 2. The member 24 is sufficiently rigid and massive to suffer negligible distortion when in use.

In the preferred embodiment, the cross section of the upper portion 29 of the member 28 is in the form of a wedge having an included angle of about 21°, the lower (or inner) surface of the wedge being normal to the axis of the load cell. The cross section of the lower portion 31 of the member 28 is also in the form of a wedge but has an included angle of about 9°, the upper (or inner) surface being disposed at about 30° to the axis of the load cell. The upper portion 29 is therefore thicker and disposed more nearly normal to the axis of the load cell than is the lower portion 31.

A spacer 30 (FIG. 2) is threadably secured to the interior of the bearing member 22 and is provided with a central aperture in which the transformer 20 is slideably engaged. The spacer 30 has a pair of slots 33 and 35 cut therein, the slot 33 intersecting with the central aperture, and the slot 35 being parallel thereto and spaced a short distance away from the central aperture at the point 37. The central aperture and the two slots 33 and 35 define a portion 39 of the spacer 30 which is attached to the main portion of the spacer only by the narrow portion at the point 37. The narrow portion 37 acts as a leaf spring to allow the portion 39 to deflect slightly to allow the transformer 20 to be slideably positioned within the central aperture. When the transformer 20 has been correctly positioned within the central aperture, a tapered screw 41 is screwed into a threaded bore near the open end of the slot 35, to urge the portion 39 into clamping engagement with the transformer 20, to prevent the latter from sliding relative to the spacer 30, and to expand the spacer 30 to fix the position of the spacer 30 relative to the bearing member 22.

The core of the transformer 20 consists of a slug constructed of material having a high magnetic permeability, and is rigidly mounted on a shaft 34 which is threadably secured in an insert 35, press fit into an upwardly extending bore 36 provided in the interior of the load receiving member 24. The shaft 34 and the insert 35 are constructed of material having a low magnetic permeability, and therefore do not affect the operation of the transformer 20.

The position of the slug 32 at no-load condition is as shown in FIG. 1, namely longitudinally centrally disposed within the interior of the transformer windings in transformer 20. As illustrated schematically in FIG. 3, the secondary of the differential transformer 20 comprises two serially connected windings 54 and 56 (FIG. 3) which produce equal and opposite voltages when the slug 32 is in the central position illustrated in FIG. 2. The net output of the secondary is therefore zero when the slug is centrally located. Relative upward or downward movement of the slug 32 causes the secondary to produce an output having a positive or negative phase, in response to the direction of movement, and an amplitude proportionate to the displacement of the slug 32 from the position illustrated in FIG. 1.

The configuration of the load receiving member 24, the bearing member 22 and the outwardly bowed annular member 28 is such as to present the bearing member 22 with a purely axial force when the load cell is under load so that the bearing member 22 is not deformed by radial forces, which would result in erroneous operation. One explanation for the mechanism by which this effect is achieved is that as the load receiving member 24 is depressed by the load, the rim of the load receiving member 24 exerts a downwardly and outwardly directed force on the outwardly bowed member 28, which gives rise to a circumferential tension in this member, and a slight expansion of the diameter of the member 28. This outward movement of the member 28 counteracts exactly the inwardly directed force which otherwise would be applied to the top of the bearing member 22 by reason of the angle with which the downwardly bowed member 28 is connected to the top of the bearing member 22.

From another point of view, the annular outwardly bowed member 28 functions as a leaf spring, to impart a torque to its lower section, when its upper section is depressed, which torque gives rise to an outwardly directed force at the top end of the bearing member 22. The unique construction of the upper and lower portions of the annular member 28, and the angles at which they are disposed, are such that the radial component of the outwardly directed torque-force exactly compensates for the inwardly directed force longitudinally along the lower portion of the annular member 28.

These explanations, however, are only theoretical and are not intended to limit the scope of the present invention. In the same way, when the load cell is used to measure tension forces (by providing the projection 26 of the load receiving member 24 with a hook or clamp) the rim of the load receiving member 24 is in compression, and the force transmitted to the bearing member 22 is also purely axial.

The absence of radial forces on the bearing member 22 permits the slug 32 to be displaced with substantially no relative movement between the bearing member 22 and the base 10 or the load receiving member 24. It has been found that this substantially eliminates hysteresis so that the same weight readings may be obtained with an ascending applied load as with a descending applied load.

The spacer 30 divides the interior of the load cell into an upper chamber 43 and a lower chamber 49. In the upper chamber 43, several electrical components are connected in circuit with each other and held in position by being soldered to the terminal pins 51 which are insulated from the spacer 30 by insulators 53. A rheostat 62 is mounted on the spacer 30 via a nut 55 threadably engaged on an outer shaft 57. An inner shaft 59 adjusts the value of resistance of the rheostat 62 in order to calibrate the load cell.

Figure 3:
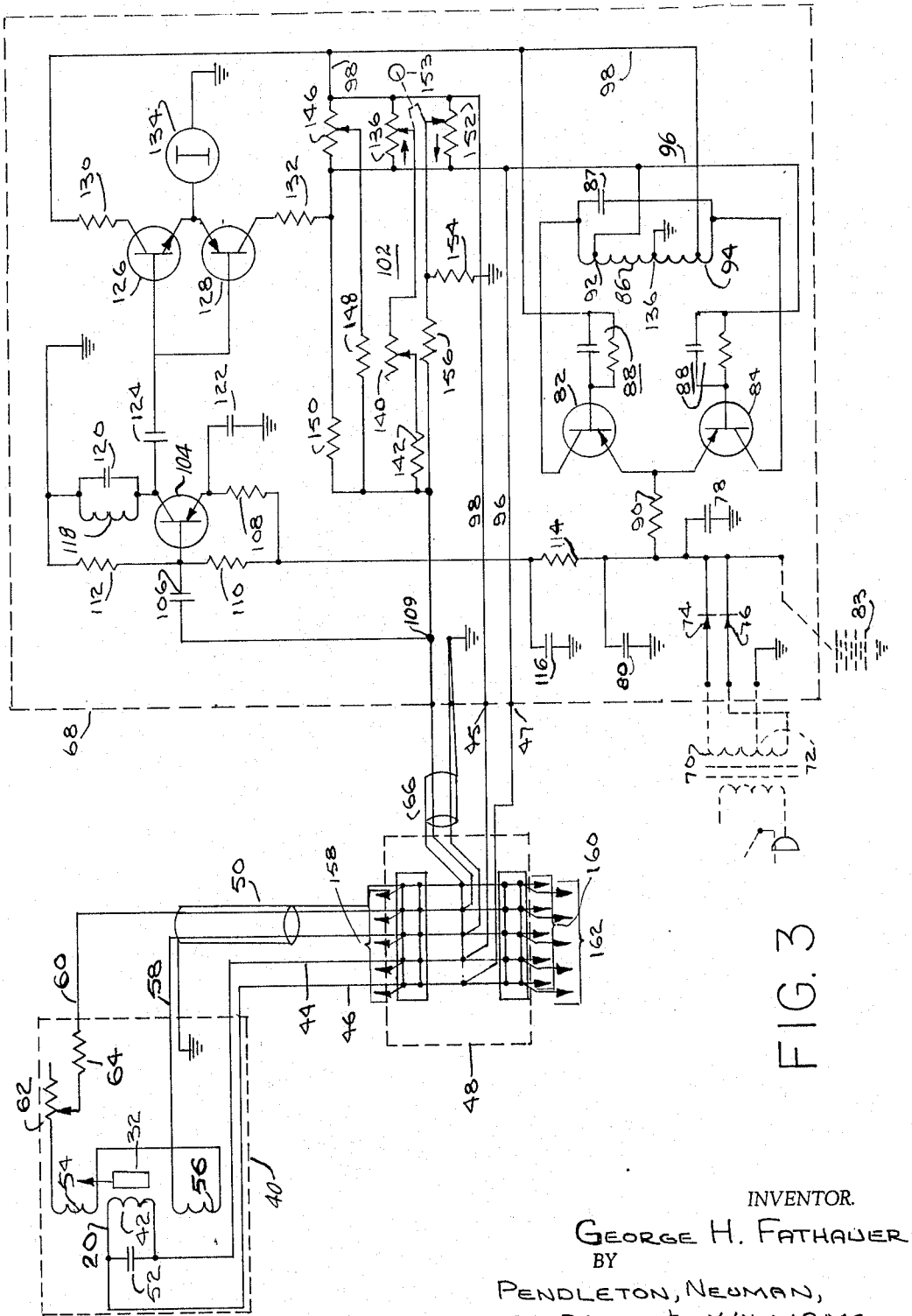
FIG. 3 is a schematic circuit diagram of a weighing system embodying the present invention and employing one or more of the load cells of FIG. 1.

The wall of the bearing member 22 is provided with a threaded bore 32 for receiving an electrical connector (not shown), through which conducting wires may be connected from the lower portions of the terminal pins 51, which project into the chamber 49, to the electronic system illustrated in FIG. 3.

Referring now to FIG. 3, the differential transformer 20 is illustrated schematically within the dashed rectangle 40, in which are contained all of the electrical components located within the load cell. The primary winding 42 of the transformer is excited by sinusoidal voltage applied through the leads 44 and 46 connected between the load cell 40 and a junction box 48. Connected in parallel with the primary winding 42 is a capacitor 52, chosen to resonate with the inductance of the primary winding 42 at the frequency of the signal applied to the primary (about 2500 c.p.s.), and thus cause the primary circuit to have a high resistive impedance at this frequency. The secondary of the differential transformer 20 is provided with two oppositely wound windings 54 and 56 which produce equal and opposite signals when the slug 32 is longitudinally centrally disposed at no-load, as described above.

Movements of the slug 32 in the direction of the arrow increase the coupling between windings 42 and 54 whereby a sinusoidal signal of one phase appears between leads 58 and 60, connected in series with the primary windings 54 and 56. Leads 58 and 60 are connected to the junction box 48 by way of the shielded cable 50. Movement of the slug 32 in a direction opposite to that of the arrow increases the coupling between windings 42 and 56, thereby producing a signal of opposite phase between leads 58 and 60 because of the direction in which winding 56 is connected. In either case, the amplitude of the signal is directly proportional to the displacement of the slug 32.

Within the load cell there is also provided a calibrating potentiometer 62 and a temperature compensating resistor 64, the function of which will be more fully described hereinafter.

By way of the junction box 48, the leads 44 and 46 are connected to points 45 and 47, respectively, and the leads 60 and 58 are connected by way of the shielded cable 66 to point 100 and ground respectively.

The electronic measuring system is indicated within the dashed rectangle 68 and may be provided with either an A.C. or D.C. power supply. If an A.C. power supply is desired a transformer 70 is provided having a secondary winding with a grounded center tap 72. Diodes 74 and 76 constitute a full wave rectifier connected to the transformer 70 to produce a D.C. voltage, smoothed by capacitor 78 and 80. If a D.C. battery is available, on the other hand, the transformer 70 and the diodes 74 and 76 are not required and are replaced by a single D.C. battery 83, the voltage of which is also stored in and smoothed by the capacitors 78 and 80.

The two transistors 82 and 84, and their associated circuitry, constitute an oscillator, generating a sine wave having a frequency of about 2500 c.p.s. Base-collector feedback is provided by a tapped inductance 86, with which a capacitor 87 is connected in parallel. The tank circuit 86–87 is tuned to resonate at about 2500 c.p.s. Each of the base terminals is provided with a parallel resistor capacitor circuit 88, which is connected to a separate one of the taps 92 and 94 of the inductance 86. The emitters of the transistors 82 and 84 are connected together and each is also connected by way of the resistor 90 to the positive voltage of the power supply present at the capacitors 78 and 80.

The output of the oscillator is taken from the two taps 92 and 94 and conveyed by way of leads 96 and 98 to the points 45 and 47, and thence to the junction box 48, from which they are connected to the primary of the transformer 20. A grounded center tap 136 insures that the oscillator output has an equal voltage on each side of ground.

The secondary of the transformer is connected, it will be remembered, through the junction box 48 to the point 100 and a ground connection. The point 100 is connected both to a resistor network indicated generally at 102 and to the base of transistor 104 through capacitor 106.

The transistor 104 and associated circuitry is connected as a tuned amplifier having an input via the capacitor 106 and an output via the capacitor 124. The transistor 104 is normally biased into conduction by the network including resistors 108, 110, 112. Positive voltage is supplied to the junction of resistors 108 and 110 through a low pass filter including the resistor 114 and the capacitor 116, from the positive voltage supply stored by the capacitor 78 and 80. The current flowing from the positive voltage source through the resistors 110 and 112 causes the potential of the emitter of the transistor 104 to become positive with respect to its base, thereby permitting current to flow from the collector through a tuned circuit including the inductance 118 and the capacitor 120, which circuit is tuned to 2500 c.p.s., the frequency generated by the oscillator. The capacitor 122 by-passes the high frequency signals to ground, and the resistor 108 co-operates with the resistor 110 to bias emitter-base junction of the transistor 104.

The tuned amplifier including the transistor 104 operates to amplify any signal of the oscillator frequency which appears at point 100. The amplified signal is fed by way of the capacitor 124 to the bases of transistors 126 and 128, which together constitute a phase detection circuit.

The transistor 126 is an NPN transistor and the transistor 128 is a PNP transistor. The emitters of both are connected together and the collectors of each are connected across the output of the oscillator through the series resistances 130 and 132, respectively. An ammeter 134 is connected between the emitter connection of the transistors 126 and 128 and ground.

It will be noted that the output of the oscillator is provided with a grounded center tap 136 and so the collectors of the transistors 126 and 128 have applied thereto equal and opposite voltages, and are thus both conditioned for conduction at the same time, viz., when the collector of transistor 126 is positive and the collector of transistor 128 is negative with respect to ground. If the signal applied to the bases of the transistors 126 and 128 is in phase with the output from tap 94 of the oscillator on line 98, the bases of the transistors 126 and 128 are positive during the half cycle in which the transistors 126 and 128 may conduct, and the transistor 126 conducts, current flowing from the transistor 126 through ammeter 134 to ground. If, however, a signal of the opposite phase is applied to the bases of the transistors 126 and 128, the bases of both of these transistors are relatively negative during their conduction period and current will flow from ground through the ammeter 134 through the transistor 128. It is noted that the direction of current through the ammeter 134 thus depends upon the phase of the signal produced by the secondary of the transformer 20.

In the operation of the electronic weighing system, a current is generated by the resistor network 102, which current is equal and opposite to the current flowing through the secondary of the transformer 20. The two currents are added at the junction point 100, and if the sum of these two currents is zero, no signal will pass through the capacitor 106 to the base of the transistor 104.

As is well-known to those skilled in the art, the sum of the currents entering a node or junction point must be equal to the sum of the currents leaving that point. Therefore, if the two currents generated respectively by the load cell 40 and the resistor network 102 are equal and opposite with respect to the junction point 100 (i.e., one current flows into the junction point and the other flows out of the junction point) there can be no current flow through the circuit including the capacitor 106. Another way of describing this condition is to say that potential at the point 100 is the same as ground potential. Hence no signal appears on the bases of the transistors 126 and 128. Therefore the transistors 126 and 128 conduct equally during their conduction period and no current flows through the meter 134.

The resistor network 102 includes three potentiometers 136, 146, and 152 which are connected across the output of the oscillator including the transistors 82 and 84. The tap of the potentiometer 136 is connected in series through a rheostat 140 and a resistor 142 to the point 100; the tap of the potentiometer 152 is connected to the point 100 through a resistor 156 and to ground through resistor 154; and the tap of the potentiometer 146 is connected to the point 100 through a resistor 148. The point 100 is also connected to one side of the oscillator output through a resistor 150. The resistance of the potentiometer 136 is the least of the three, while that of the potentiometer 152 is the greatest.

The function of the potentiometer 146 is to achieve a balanced current condition in the system when no load is being applied to the load cell. In such a no-load condition, the potentiometer 136 has its tap positioned toward the right-hand side, as viewed in FIG. 3. This produces a current flowing through the point 100 which is substantially balanced by current flowing through the resistor 150, which is connected in common with the left-hand end of the potentiometer 136. Exact balance is achieved by adjusting the position of the tap on the balance potentiometer 146, so that the sum of the currents at the point 100 is zero and no net current flows through the capacitor 106 to the transistor 104. The balance potentiometer 146 also compensates for any no-load current flowing through the secondary windings 54 and 56 of the transformer 20, due to the slug 32 not being precisely centered. The right-hand position of the tap of the potentiometer 136 corresponds with the zero position of the dial 153, which is mechanically connected to the control shafts of the potentiometers 136 and 152.

The control shafts of the potentiometer 136 and 152 are mechanically connected together by gears or the like so that the taps of the potentiometers 136 and 152 are moved together, but each in an opposite direction with respect to the output of the oscillator, as indicated in FIG. 3 by the dashed line interconnecting the taps of the potentiometers 136 and 152, and the directional arrows associated with those taps. The dial 153 is calibrated in pounds to provide for direct reading of the weight supported by the load cell when the system is brought into balance by rotating the control shaft. The tap of the potentiometer 136 is thereby adjusted to provide an amount of current, of either positive or negative phase, flowing through the potentiometer 136, the rheostat 140 and the resistor 142 to the point 100 which exactly counterbalances the current flowing through the secondary of the transformer 20 to the point 100. When this occurs, the voltage at the point 100 is the same as ground potential, and no current is supplied to the transistor 104. The meter 134 therefore indicates a balanced condition of the circuit, and the weight supported by and acting on the load cell may be read directly from the dial.

The function of the resistor 142 and the calibrating rheostat 140 is to insure that the rotation of the control shaft of the potentiometer 136 has the effect of increasing or decreasing the amount of current generated by the resistance network 102 in proportion to the change in the number of pounds indicated by the dial. For example, if the load cell is calibrated to generate a secondary current which increases by 3.333 microamps for every thousand pounds, then the rotation of the potentiometer control shaft of the potentiometer 136, to increase the weight shown on the dial, produces an increase of 3.333 microamps of current flowing between the potentiometer 136 and the point 100 for every increase of a thousand pounds on the dial. Varying the amount of resistance in the circuit by varying the position of the tap of the rheostat 140 has the effect of changing the ratio of current to pounds, and thus the current rate may be easily calibrated to match the corresponding rate of the load cell. The presence of the fixed resistance 142 lessens the required range of the rheostat 140.

During the operation of the weighing system, when the tap of the potentiometer 136 is moved from its central position, current flows from one side of the oscillator output, through the tap of the potentiometer 136, the rheostat 140 and the resistor 142 to the point 100, and thence through the secondary winding of the load cell transformer, returning to the grounded center tap of the oscillator output. The movement of the position of the tap of the potentiometer 136 affects the amount of resistance in this circuit, and, if uncompensated, would produce a "loading" error in the determination of the weight acting on the load cell 40. Thus, when a large load is being weighed, the tap of the potentiometer 136 is moved far away from its no-load central position, and the resistance in the series circuit including the potentiometer 136 is reduced. The potentiometer 152 compensates for this effect. The tap of the potentiometer 152 selects a voltage opposite in phase to that selected by the tap of the potentiometer 136. The resistor 154 has a relatively low value, and the resistor 156 has a relatively high value, so that the potentiometer 152 does not greatly affect the current generated by the resistor network 102, but does so just enough to correct for the loading error which would otherwise occur as a consequence of the movement of the tap of the potentiometer 136.

It has already been described that the load cell 40 is calibrated to generate a current proportional, at a predetermined rate, to the load applied to the load cell. This rate is calibrated by the series resistor 64 and the rheostat 62 within the load cell 40. In calibrating the load cell, the output leads 58 and 60 are short-circuited and the rheostat 62 is adjusted by rotating its control shaft 59 until the desired predetermined rate is attained between two known conditions of load, one of which may be no-load, and the other of which may be the application of a standard weight to the load cell. The calibration rate of the load cell is found by dividing the difference between the short-circuit currents generated in the two test conditions, by the difference between the weights supported by the load cell in the two test conditions. The calibration of the load cell 40 under short-circuit conditions introduces no error, since it is the short-circuit current which flows through the secondary of the transformer 20 when the weighing system is balanced (i.e., when the point 100 is at ground potential).

The feature of the present invention which permits the precalibration of the load cell, achieves the advantage of permitting the addition of other like precalibrated load cells in parallel to the load cell 40, to extend the range of the weighing system without the necessity of recalibrating the weighing system itself. Other load cells may be connected to the junction box 48 by leads indicated as groups 158, 160, and 162. The addition of such other load cells has little effect on the oscillator because of the tuned primary circuits of the transformers of such load cells. The primary impedance is totally resistive, and no reactance is reflected back into the oscillator circuit, which might otherwise change the frequency of the oscillator. The resonant primary circuits also present a high resistance to the oscillator, and therefore, do not present much additional load.

Another condition which influences the accuracy of the load cell is varying the temperature of the enviroment. The preferred material of which the load cell of the present invention is constructed is steel having a high nickel content, to provide good magnetic shielding. The use of such a steel enables each of the load cells to operate over a range of zero to 30,000 pounds. Such steel has a modulus of elasticity which varies by approximately .01% per degree F., thereby providing greater deflection of the load cell 40 and a greater current output of the secondary of the transformer 20 at elevated temperatures. To compensate for this effect, resistor 64 is constructed of a nichrome alloy which has an increasing resistivity with increased temperature. The particular value of the resistance depends somewhat on the construction of the transformer 20 and the material of which its windings are composed, since these elements also affect the current variation with temperature. It has been found that the use of such a resistor reduces the temperature sensitivity to about .002 percent per degree C.

Although the present invention has been described in terms of a weighing system, those skilled in the art will understand that the principles of the present invention can easily be applied to measure other forces, in whatever direction they act, so long as the force to be measured is directed axially with respect to the load cell. The system of the present invention can also be easily adapted to measure tension forces, by simply providing the projection 26 of the load receiving member 24 with a hook or clamp well known in the prior art. This may be formed integrally with the projection 26 or welded thereto.

Without further elaboration, the foregoing will so fully explain the character of my invention that others may, by applying current knowledge, readily adapt the same for use under varying conditions of service while retaining certain features which may be properly said to constitue the essential items of novelty involved, which items are intended to be defined and secured to me by the following claims.

I claim:

1. A force measuring system comprising an integral load cell having a fixed relatively massive and rigid load-bearing member, a circular, relatively massive, and rigid load-receiving member adapted to receive a force to be measured, an annular relatively thin and flexible outwardly-bowed member integral with said load-receiving member and connected to said load-bearing member for transmitting load substantially in an axial direction to said load-bearing member, the displacement of said load-receiving member relative to said load-bearing member being substantially without hysteresis, and means for electrically measuring said displacement.

2. A force measuring system comprising a load cell having a base, a hollow relatively massive and rigid load-bearing member having circular cylindrical inside and outside walls, one end of said load-bearing member being secured to said base, a disk-shaped relatively massive and rigid load-receiving member axially aligned with said load-bearing member and having a central portion adapted to receive a force, and an outwardly-bowed relatively thin and flexible annular member having one end integral with the periphery of said load-receiving member and the other end integral with the inside wall of the end of said cylindrical wall opposite said one end thereof for transmitting load substantially in an axial direction from said load-receiving member to said bearing member, and means for electrically measuring the displacement of said load-receiving member in response to the force acting on said load-receiving member.

3. A force measuring system comprising a load cell having a displaceable member, said member being displaceable proportionally to the force acting on said load cell, a transformer having primary and secondary windings, means for electrically exciting said primary winding, said primary and secondary windings being inductively coupled by said displaceable member whereby the secondary winding generates a first electrical current proportional to the displacement of said displaceable member, generating means for generating a controlled electrical current of opposite sign with respect to said first current, means for summing said displacement and controlled currents, detector means receiving the sum of said currents and responsive to said summing means for indicating when the sum of said displacement and controlled currents is zero, control means operatively coupled with said generating means for selectively varying said controlled current, and indicating means operatively associated with said control means for indicating directly the force acting on said load cell when said detector means indicates a zero current sum.

4. A force measuring system comprising a load cell for receiving a force, said load cell having a first generating means for generating a voltage proportional to the amount of force acting on said load cell and a calibrated impedance connected in series with said first generating means to provide a calibrated short-circuit current through a series circuit including said first generating means and said impedance, said short-circuit current being proportional to the amount of force acting on said load cell, a second generating means remote from said load cell for generating a controlled current, control means operatively associated with said second generating means for varying said controlled current indicating means operatively associated with said control means to indicate the force acting on said load cell when said controlled current is equal to said short-circuit current, and means receiving said controlled current and the current of said first generating means to indicate the sum thereof.

5. A force measuring system comprising a load cell for receiving a force to be measured; said load cell having a displaceable element displaced in response to said force and a transformer having primary and secondary circuits including primary and secondary windings inductively coupled by said displaceable element, said secondary circuit generating a current proportional to the force acting on said load cell, said primary circuit energized with a signal of known frequency and including negative reactance means having a reactance substantially equal to the reactance of said primary winding at said known frequency, generating means for exciting said primary winding with an alternating current, and means for measuring the current generated by said secondary circuit for indicating the force acting on said load cell.

6. The force measuring system of claim 5 including calibrated impedance means connected in series with said secondary winding, for producing a calibrated current when the circuit including said secondary winding and said calibrated impedance means is short-circuited.

7. Apparatus according to claim 6 wherein said impedance means is temperature responsive to vary its impedance with temperature in proportion to the variation with temperature of the voltage produced by said generating means.

8. A force measuring system comprising a load cell for receiving a force to be measured, said load cell having first generating means for generating a first current proportional to the force acting on said load cell; second generating means for generating a controlled current of opposite sign with respect to said first current; said second generating means including first and second variable voltage sources, and adjustable means for selectively decreasing the voltage of said first source and for simultaneously increasing the voltage of said second source, thereby to vary said controlled current; means for summing said first and controlled currents, and means responsive to said first and second generating means for indicating when the sum of said first and controlled currents is zero.

9. A force measuring system comprising a load cell for receiving a force to be measured, said load cell having a differential transformer having primary and secondary circuits; means for supplying an alternating voltage to said primary circuit; said secondary circuit generating a first current proportional to the force acting on said load cell, a generating means for generating a controlled current of opposite sign with respect to said first current, said generating means including a pair of potentiometers connected across said alternating voltage, each of said potentiometers having a variable tap by which a predetermined amplitude of alternating voltage may be selected, and movable means for decreasing the voltage present at the tap of one of said pair of potentiometers and for simultaneously increasing the voltage present at the tap of the other of said pair of potentiometers, whereby the voltage at the tap of said other potentiometer compensates for a change in the amount of resistance in the circuit through which the said controlled current flows.

10. A force measuring system comprising a load cell for receiving a force, said load cell including a differential transformer for generating a first current proportional to the force acting on said load cell, a generator for supplying an alternating voltage to the primary of said differential transformer, a network connected to said generator for generating an adjustable current of opposite sign with respect to said first current, detector means responsive to said transformer for detecting a no-load current flowing through said load cell when no force is acting on said load cell, said network including a variable current source and means for connecting said variable current source to said detector means in additive relation ship with said load cell, means for adjusting said variable current source to cause said adjustable current to become equal to said no-load current, whereby said detector is operative to indicate a balanced no-load current condition irrespective of said no-load current.

11. A force measuring system comprising a load cell for receiving a force, said load cell having a transformer with primary and secondary windings, means for electrically exciting said primary winding, said primary and secondary windings being inductively coupled by a displaceable member within said load cell to produce at said secondary a first electrical current proportional to the force acting on said load cell, series impedance means at said secondary winding, generating means for generating a controlled electrical current of opposite sign with respect to said first electrical current, means for connecting said first and said second currents to a common junction, detector means connected to said junction and responsive to said first and controlled currents for indicating when said first and said second currents are equal and of opposite sign, said detector means also indicating an inequality of said first and second currents, control means operatively coupled with said generating means for varying said controlled current, and indicating means operatively associated with said control means for indicating directly the force acting on said load cell when said detector means indicates that said first and second currents are equal and of opposite sign.

12. A force measuring system comprising a load cell responsive to the force acting on said load cell for producing a first alternating voltage having an amplitude proportional to said force, impedance means for causing said first voltage to produce a corresponding first current proportional to said force, generating means for generating a controlled alternating voltage, variable impedance means for causing said controlled alternating voltage to produce a controlled alternating current, detecting means for indicating the algebraic difference between said first current and said controlled current, said detector means comprising first and second transistors connected to conduct a series current through both of said transistors, means for connecting said first and controlled currents with a control terminal of each said first and second transistors, and said series circuit formed by said first and second transistors being connected in series with said generating means voltage to simultaneously condition each of said transistors for conduction and a null indicating device connected between a reference potential and a connection common to said first and second transistors in said series current path for visually indicating the relative phase of a signal detected at said control terminals with respect to alternating voltage of said generating means.

13. A force measuring system comprising a plurality of load cells each having a differential transformer and means for causing said differential transformer to conduct a secondary current directly proportional to the force acting on each of said load cells, impedance means for connecting the secondaries of each of said transformers in parallel, whereby the current produced by all of said load cells is added at a junction point to result in a total composite current flowing between said junction point and said plurality of load cells, generating means for generating a controlled current of opposite sign with respect to said composite current, means for connecting said generating means to said junction point, means for adjusting said controlled current, detector means for indicating when said controlled current is the same magnitude as said composite current, and indicating means operatively associated with said control means for indicating directly the total force acting on all of said load cells when said detector means indicates that said composite and controlled currents are of the same magnitude.

14. A force measuring system comprising a plurality of load cells for together supporting a weight, each of said load cells having a member displaceable in response to the force acting on said load cell and differential transformer responsive to displacement of said displaceable member for producing an output signal proportional to said displacement, generating means for generating an alternating voltage of a predetermined frequency, means for connecting said generating means to the primary of each differential transformer within each of said load cells, means within each load cell connected across said primary in parallel with said primary and with said generating means for causing the primary circuit of each differential transformer to resonate at said predetermined frequency thereby to determine an impedance of said primary circuit which is purely resistive in character, and means for measuring of combined output signals of all of said load cells for determining the total force acting on said load cells.

15. A force measuring system comprising a plurality of load cells, each of said load cells having current generating means for generating a current proportional to the force acting on said load cell, and measuring means for measuring the combined total current generated by said load cells thereby to indicate the total weight supported by said load cells, said measuring means comprising a first adjustable voltage source connected to a first point, a second adjustable voltage source connected to a second point, means for simultaneously adjusting both of said voltage sources to produce a first voltage at said first point and a second voltage at said second point, the difference between each of the said first and second voltages and a reference potential being inversely proportional, means for connecting said first and second points to a third point to produce a controlled current at said third point, and detector means connected to said third point and responsive to said total current for indicating when said controlled current is equal to the sum of the currents individually generated by each respective load cell.

16. A force measuring system comprising a load cell having a fixed load bearing member, a load receiving member, and an annular intermediate member interposed between said load bearing member and said load receiving member, said intermediate member having a first annular portion having a wedge shaped cross section disposed at a first angle with respect to the axis of said annular member, and a second annular portion having a different wedge shaped cross section disposed at a second angle with respect to the axis of said annular member, a displaceable member secured to said load receiving member and adapted to be displaced with respect to said load bearing member in proportion to the force acting on said load receiving member in response to resilient displacement of said intermediate member, and means secured to said load bearing member and responsive to displacement of said displaceable member to produce an electrical signal proportional to the force acting on said load receiving member.

17. A force measuring system energized from an electrical source of known frequency comprising a load cell having a load-bearing member, a load-receiving member, and a yieldable member interconnecting said load-bearing member and said load-receiving member for permitting said load-receiving member to be displaced in response to the force acting on said load-receiving member, a differential transformer including a relatively movable portion having a high magnetic permeability and a portion comprising primary and secondary winding means, one of said portions being operatively secured to said load-bearing member, the other of said portions being operatively secured to said load-receiving member and located in inductive coupling relation with said one of the portions of said differential transformer to cause said secondary winding means to produce an electrical signal proportional to the force acting on said load-receiving member, said differential transformer being located in a cavity bounded by said load-receiving member, said load-bearing member, and said intermediate member, a capacitor contained within said cavity connected in parallel with the primary of said transformer to tune said primary to about said known frequency, resistance means contained within said cavity and connected in series with said secondary of said transformer, and means for measuring the current flowing through the secondary of said transformer thereby to indicate the force acting on said load cell.

18. Apparatus according to claim 17 wherein said resistance means is temperature responsive to vary its impedance with temperature in a predetermined relationship to the variation with temperature of the signal produced by said secondary.

19. Apparatus according to claim 18 wherein said generator means comprises first and second variable voltage sources and means for deriving said controlled current from said first and second voltage sources, and said control means comprises means for simultaneously raising the voltage produced by said first voltage source and lowering the voltage produced by said second voltage source.

20. Apparatus according to claim 17 wherein said measuring means comprises generator means for generating a controlled current, means for summing said controlled current with said secondary current, detector means for indicating when said controlled current is equal to and opposite in sign with respect to said secondary current, control means for adjusting the value of said controlled current, and indicating means operatively associated with said control means for indicating directly the force acting on said load receiving member when said detector means indicates that said secondary and controlled currents are equal and opposite.

21. Apparatus according to claim 20, including no-load compensation means comprising a variable voltage source, means connecting said variable voltage source to said secondary, and means for adjusting said variable voltage source to produce a current flowing through said secondary at no-load equal to that current which would flow in said secondary if the circuit including said secondary and said resistance means were short-circuited.

22. A force measuring system comprising an integrally formed load cell having a relatively massive and rigid fixed load-bearing member, a relatively massive and rigid load-receiving member adapted to receive a force to be measured, a relatively thin and flexible outwardly-bowed member connected with said load-receiving member and with said load-bearing member for transmitting load substantially in an axial direction to said load-bearing member, each of said members being bodies of revolution and formed integrally with each other to have a common axis of revolution, the displacement of said load-receiving member being substantially without hysteresis and substantially a linear function of the force acting on said load-receiving member, and means for electrically measuring said displacement.

23. A force measuring system comprising a load cell having a fixed load-bearing member, an annular load-receiving member adapted to receive a force to be measured, an annular outwardly-bowed member integral with said load-receiving member and connected to said load-bearing member for transmitting load substantially in an axial direction to said load-bearing member, said outwardly-bowed member having upper and lower portions, said upper portion having a first wedge shaped cross section, one side of said first cross section being disposed normal to the axis of said load cell, said lower portion having a second wedge shaped cross section, both sides of said second cross section being disposed at acute angles to said axis, said first cross section having a larger included angle than said second cross section, and means for electrically measuring the displacement of said load-receiving member in response to a force acting on said load-receiving member.

24. A force measuring system comprising an integrally formed load cell having a relatively massive and rigid transverse annular load-bearing member, a relatively massive and rigid circular load-receiving member, said members being axially aligned, axially separated to define an intermediate space and adapted to receive a force to be measured therebetween, a relatively thin annular web member integral with said load-bearing member and said load-receiving member and coaxial therewith and extending axially between said members to span said space whereby said load-bearing member and said load-receiving member are substantially free of deforming radial forces, and deflection sensing means connected to said load-bearing member and said load-receiving member, the axial deflection sensed thereby indicating the magnitude of said force.

References Cited by the Examiner

UNITED STATES PATENTS

| | | |
|---|---|---|
| 2,434,547 | 1/1948 | Browne. |
| 2,495,157 | 1/1950 | Browne. |
| 2,600,029 | 6/1952 | Stone _____ 73—88.5 |
| 2,611,812 | 9/1952 | Hornfeck _____ 340—199 |
| 2,653,475 | 9/1953 | Kraus _____ 177—211 X |
| 2,786,669 | 3/1957 | Safford et al. _____ 73—141 X |
| 2,827,787 | 3/1958 | Kroeger _____ 340—199 X |
| 2,839,919 | 6/1958 | Lathrop _____ 73—141 |
| 2,907,932 | 10/1959 | Patchel _____ 307—88.58 |
| 3,034,345 | 5/1962 | Mason _____ 73—141 |
| 3,088,083 | 4/1963 | Ward _____ 73—88.5 X |

FOREIGN PATENTS 617,423   2/1949   Great Britain.

OTHER REFERENCES

German application No. 1,129,317, Schenck Maschinenfab, published May 1962 (2 sht. dwg., 3 pp. spec.).

RICHARD C. QUEISSER, *Primary Examiner.*

DAVID SCHONBERG, *Examiner.*

E. KARLSEN, G. GRON, *Assistant Examiners.*